UNITED STATES PATENT OFFICE.

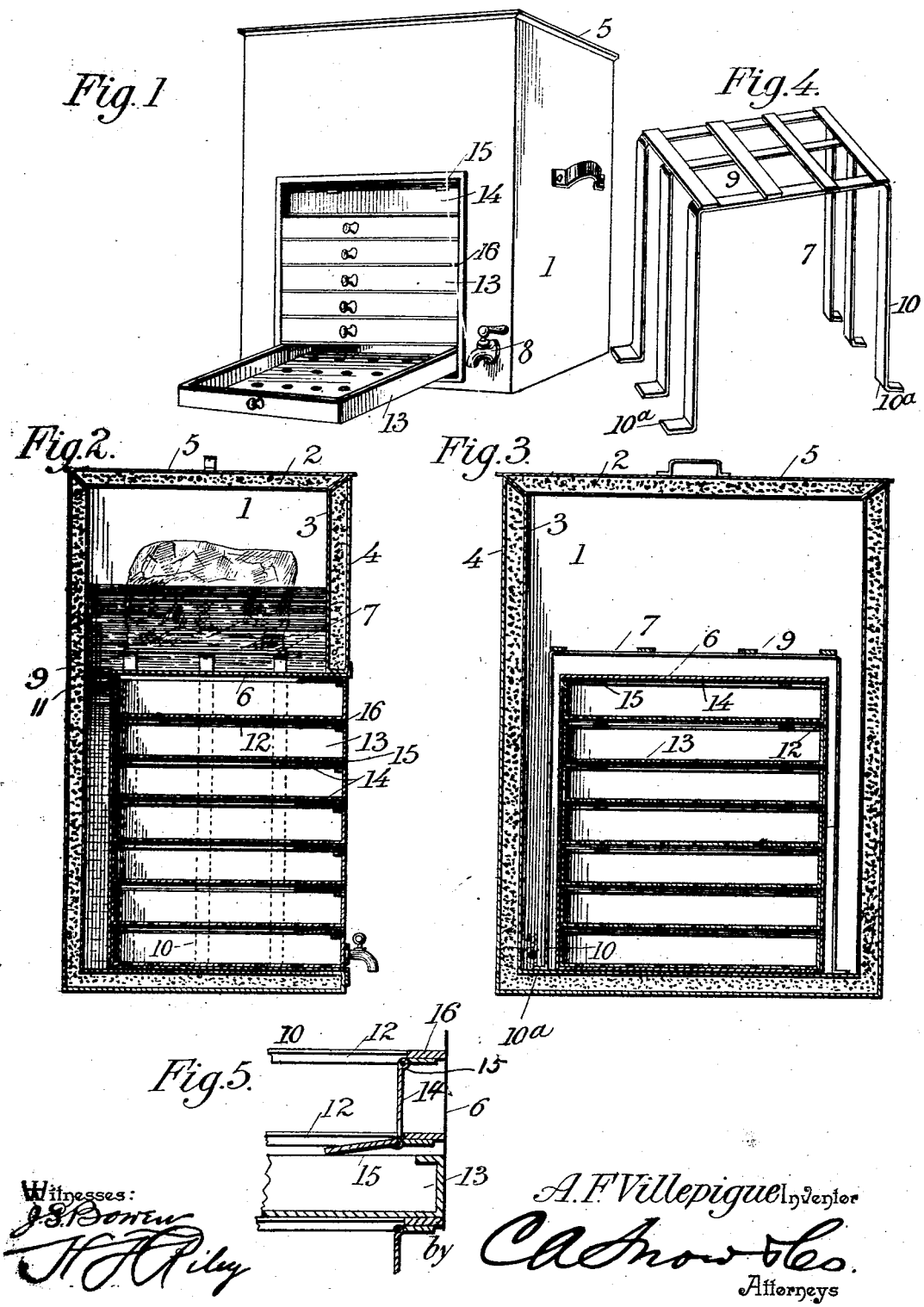

AUGUSTE FRANCIS VILLEPIGUE, OF DODGE CITY, KANSAS.

REFRIGERATOR.

SPECIFICATION forming part of Letters Patent No. 677,481, dated July 2, 1901.

Application filed March 15, 1901. Serial No. 51,371. (No model.)

*To all whom it may concern:*

Be it known that I, AUGUSTE FRANCIS VILLEPIGUE, a citizen of the United States, residing at Dodge City, in the county of Ford and State of Kansas, have invented a new and useful Refrigerator, of which the following is a specification.

The invention relates to improvements in refrigerators.

The object of the present invention is to improve the construction of refrigerators and to provide a simple and comparatively inexpensive one adapted to serve as a water and butter cooler and designed especially for use in connection with dining-rooms and analogous places where it is necessary to serve small dishes of butter and ice-water and where it is desirable to have such articles within convenient reach.

The invention consists in the construction and novel combination and arrangement of parts hereinafter fully described, illustrated in the accompanying drawings, and pointed out in the claims hereto appended.

In the drawings, Figure 1 is a perspective view of a combined butter and water cooler constructed in accordance with this invention. Fig. 2 is a vertical sectional view of the same. Fig. 3 is a similar view taken at right angles to Fig. 2. Fig. 4 is a detail perspective view of the ice-rack. Fig. 5 is an enlarged detail sectional view illustrating the construction and arrangement of the hinged lids or doors.

Like numerals of reference designate corresponding parts in all the figures of the drawings.

1 designates an approximately rectangular casing, preferably constructed of sheet metal and composed of inner and outer shells spaced apart and provided with a filling 2 of charcoal or other suitable material. The inner shell or wall 3 may be united with the outer wall or shell 4 in any suitable manner, and the casing is provided with a removable cover 5, constructed substantially the same as the walls of the casing and preferably provided with a filling of charcoal. The casing is provided at its top with an opening in which is mounted a sheet-metal box 6, forming a compartment and located a sufficient distance below the top of the casing to provide an ice-receiving space. The ice, which is supported by a rack 7, is located at the top of the casing, and the ice-water, as clearly indicated in Fig. 2 of the accompanying drawings, surrounds the box and is adapted to be drawn off through a faucet 8, located at the bottom of the casing. The rack, which straddles the chamber for the reception of the butter, is adapted to relieve the box 6 of the weight of the ice, and it consists of a substantially rectangular top 9 and legs 10, located at opposite sides of the box and having their lower terminals bent outward to form feet 10$^a$. The rack is removable and is adapted to be readily taken out of the casing when it is desired to clean the same. The removal of the top or cover 5 exposes the interior of the cooler, and the latter may be conveniently and thoroughly cleaned when desired.

Within the chamber formed by the box are arranged horizontal supports 12, consisting of strips of metal soldered or otherwise secured to the walls of the chamber and adapted to receive a series of removable drawers 13, designed to contain the receptacles for butter. The bottoms of the drawers are perforated to permit a free circulation of cold air throughout the chamber, and butter and butter-chips will be kept perfectly cold, and ice-water will be utilized for this purpose.

In order to prevent the escape of cold air when one of the drawers is removed, the chamber is provided at its front with a series of hinged lids 14, suspended at their upper edges by hinges 15 and adapted to drop automatically and close the space between the remaining drawers, as clearly indicated in Fig. 1 of the drawings. The rear walls of the drawers are provided with extensions adapted to prevent the drawers from being accidentally withdrawn entirely from the chamber. When it is desired to remove the drawers, the finger is inserted and the lid or door is lifted sufficiently to permit the rear wall of the drawer to clear it. When the drawer is inserted, the lids swing upward automatically and permit the drawers to pass them. The hinged lids or doors are supported from bars or parting-strips 16, arranged at the front of the casing. When the drawers are in the chamber, the hinged lids rest upon their side edges, and should a drawer be pulled outward the projecting upper portion at the back of the drawer will engage the hinged lid and will be stopped by the same. By supporting the hinged lids or doors in this manner they will not interfere with the contents of the drawers.

It will be seen that the combined butter and water cooler is simple and comparatively inexpensive in construction, that the ice-water is utilized for keeping the butter cool, and that the hinged lids automatically close the space occasioned by the removal of the drawers.

What I claim is—

1. A device of the class described comprising a casing, a vertical series of removable drawers, and the lids or doors arranged at the front of the casing and supported in an open or raised position by the said drawers when the latter are closed and arranged to close automatically the spaces occupied by the front of the drawers when the same are removed, substantially as described.

2. A device of the class described comprising a casing having a cooling-chamber, removable drawers, and the automatically-closing drop-lids located at the front of the casing and normally supported in an elevated position by the drawers and arranged to close the front of the casing automatically when the drawers are removed, said lids being also arranged to limit the outward movement of the drawers, substantially as described.

3. A device of the class described comprising a casing having a cooling-chamber, removable drawers, and the lids hinged at their upper edges at the top of the drawers and arranged to close the spaces between the drawers at the front of the casing, said lids being supported by the said drawers and arranged to engage the back thereof to limit the outward movement of the drawers, substantially as and for the purpose described.

4. A device of the class described comprising a casing having a cooling-chamber, removable drawers provided with projecting portions at the back, and the hinged drop lids or doors resting upon the sides of the drawers and supported in an elevated position by the same and arranged to drop and close the front of the casing automatically when the drawers are removed, said lids or doors being arranged to be engaged by the said projecting portions of the drawers, substantially as described.

In testimony that I claim the foregoing as my own I have hereto affixed my signature in the presence of two witnesses.

AUGUSTE FRANCIS VILLEPIGUE.

Witnesses:
 PAUL HENKEL,
 H. A. BURNETT.